United States Patent [19]
Simmons, Jr.

[11] 3,874,974
[45] Apr. 1, 1975

[54] APPLICATION OF TREAD STRIP TO TIRE CASING

[76] Inventor: Kenneth I. Simmons, Jr., Rt. 1, Hartford City, Ind. 47348

[22] Filed: Mar. 20, 1973

[21] Appl. No.: 343,149

Related U.S. Application Data

[63] Continuation-in-part of Ser. No. 76,195, Sept. 28, 1970, Pat. No. 3,728,181.

[52] U.S. Cl. ............... 156/405, 156/96, 156/130, 156/415
[51] Int. Cl. ............... B29h 17/37, B29h 17/372
[58] Field of Search ....... 156/130, 96, 128 I, 128 R, 156/415, 405, 406

[56] References Cited
UNITED STATES PATENTS

| | | | |
|---|---|---|---|
| 1,246,488 | 11/1917 | Swartz | 156/405 |
| 1,255,073 | 1/1918 | Abbott, Jr. | 156/405 X |
| 2,110,293 | 3/1938 | Fisher | 156/96 |
| 2,282,580 | 5/1942 | Hawkinson | 156/96 |
| 2,761,488 | 9/1956 | Kreighbaum | 156/405 |
| 2,976,910 | 3/1961 | Nowak | 156/96 |
| 3,151,013 | 9/1964 | Nebout | 156/405 |
| 3,223,572 | 12/1965 | Holloway et al. | 156/405 X |
| 3,409,490 | 11/1968 | Pacciarini et al. | 156/128 I |
| 3,728,181 | 4/1973 | Simmons, Jr. | 156/130 |

| | | | |
|---|---|---|---|
| 3,746,597 | 7/1973 | Appleby et al. | 156/405 |

FOREIGN PATENTS OR APPLICATIONS

| | | | |
|---|---|---|---|
| 222,115 | 3/1958 | Australia | 156/96 |
| 663,312 | 12/1951 | Great Britain | 156/405 |

*Primary Examiner*—Clifton B. Cosby
*Attorney, Agent, or Firm*—Cushman, Darby & Cushman

[57] ABSTRACT

A precured or uncured rubber tread strip is applied to a tire casing mounted for rotation about its axis by pressing the leading edge of a continuous tread strip against the tire periphery with a cold vulcanizing bonding medium disposed between the tire and the strip, driving either the tire or strip to cause rotation of the tire and wrapping of the strip around the tire, sensing the arrival of the leading edge of the strip at a predetermined point and cutting the strip in response to the arrival of the leading edge of the strip at a predetermined location. The position of the sensor or of the cutter is automatically adjusted in accordance with tire size so as to produce a strip of the appropriate length for the tire. The strip may be stretched longitudinally as it is applied to the tire or the tire circumference may be reduced by spreading the beads prior to application of the strip.

8 Claims, 8 Drawing Figures

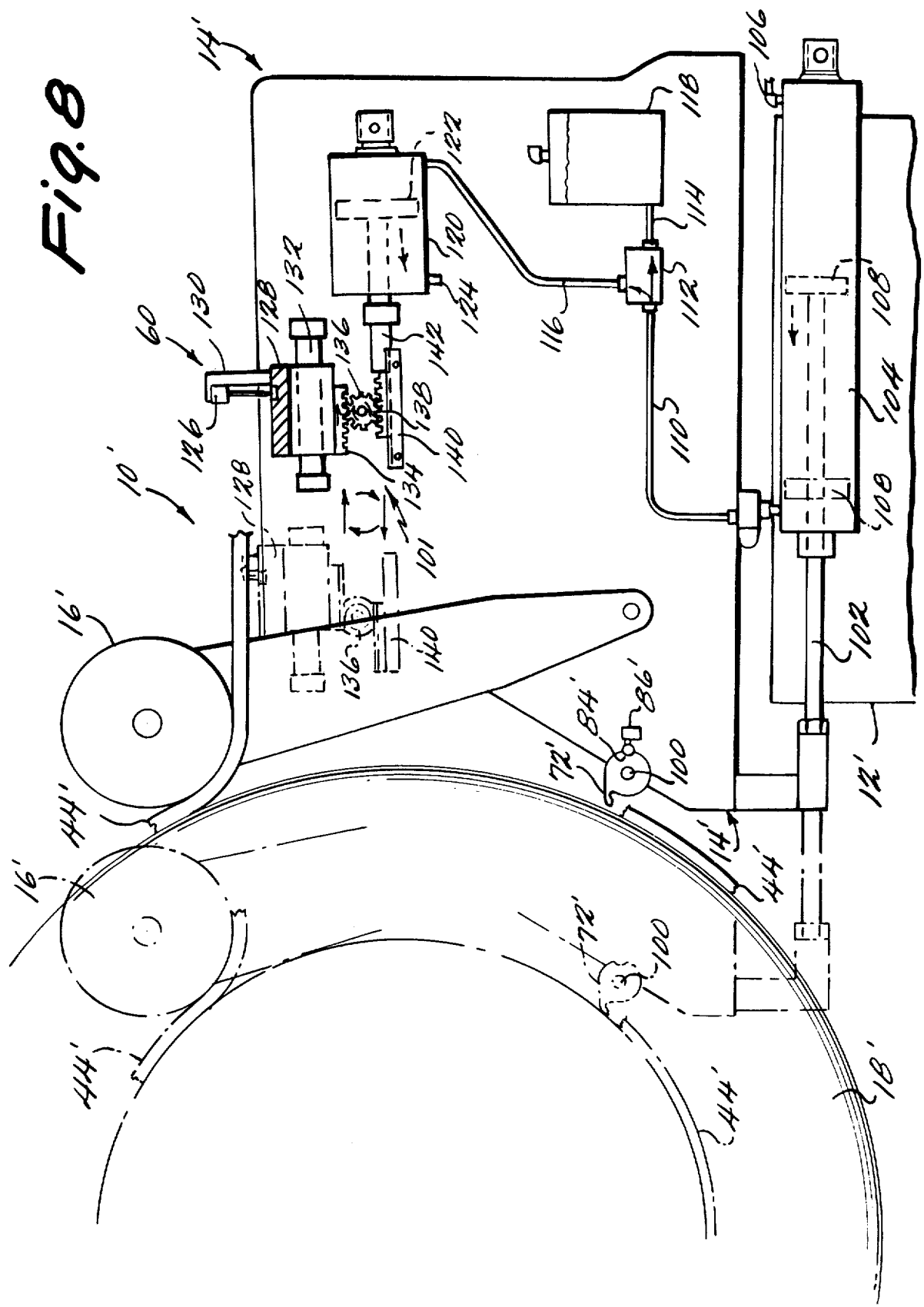

APPLICATION OF TREAD STRIP TO TIRE CASING

This is a continuation-in-part of application Ser. No. 76,195 filed Sept. 28, 1970, now U.S. Pat. No. 3,728,181.

This invention relates to methods and apparatus for applying precured or uncured rubber tread strips to tire casings prior to cold vulcanization of the tread to the tire.

It is known to retread tire casings with precured or prevulcanized rubber tread strips pre-cut to the proper length by first wrapping the tread strips around the periphery of the tire casings, with a suitable bonding medium interposed between the tread strip and the tire casing, splicing the ends of the tread strip and then, as a separate operation, subjecting the assembly to heat and pressure to vulcanize the tread strip to the tire casing. The length of the tread strip which is wrapped around the tire casing must, of course, be matched to the circumference of the casing in order that the ends of the strip can be properly spliced together. In current practice, the correct length is cut from a roll of tread strip by an operator who develops a technique for estimating the required length. A mechanized system is disclosed in Australian Pat. No. 663,312, wherein the leading edge of uncured tread stock being forwarded from a supply is sensed at a given location by a cam which operates to stop the feed drive. The position of the cam is adjusted by the operator through trial and error until the correct length of tread stock is obtained for the tire being processed.

The present invention provides a method and apparatus for withdrawing the tread strip from a supply thereof in such a manner that the required length is automatically obtained for the tire being processed, without resorting to trial and error adjustments of the mechanical components of the system. More specifically, the invention provides a special arrangement of a tread cutter for cutting a strip of tread from a supply thereof and a sensor for sensing the arrival of the leading edge of the tread strip as it progresses around the axis of the tire casing. The arrangement is such that the position of either the sensor or the cutter is adjusted automatically for each tire being processed so that actuation of the sensor by the leading edge of the tread strip occurs when the correct length of tread strip for that tire casing has been fed from the supply of tread. The cutter is then operated so as to cut this correct length.

The invention also relates to a method and apparatus for feeding the tread strip and a strip of bonding medium from their respective sources and applying the strips substantially simultaneously to the periphery of a rotating tire.

As is known, a cold retreading operation employs a precured or prevulcanized tread strip which is bonded to the periphery of a prepared tire casing by means of a bonding medium which is vulcanized at relatively low temperature, usually not greater than about 210°F and more often below about 200°F and down to 140°F or even lower. The bonding medium includes unvulcanized rubber, a vulcanizing agent such as sulfur and one or more vulcanizing agents which become active and promote the vulcanizing action at the specified low temperatures. Currently, the preferred bonding medium is a thin flexible strip compounded of unvulcanized rubber and the vulcanizing agent and the accelerator, the last two components being in a stabilized form such that vulcanization does not occur until heat is applied. Another form of bonding medium is manufactured in two flexible strips of rubber, one strip containing the vulcanizing agent and the other containing the low-temperature accelerator. Yet another form is manufactured as a single rubber strip containing either the vulcanizing agent or the low-temperature accelerator and a gummy solution containing whichever component of the vulcanizing system is not present in the strip. In employing the two-strip or strip-plus-solution bonding mediums the components are kept apart until just before use and are then interposed between the tread strip and the tire casing at the beginning of the retreading operation. The present invention contemplates the use of any of these bonding mediums and it is intended that the latter term as used herein be so construed, although for simplicity in the description which follows only one strip of bonding medium is referred to. Also, it will be understood that the hereinafter described processes may include the conventional step of applying rubber cement to the tire periphery prior to applying the tread strip.

The prevulcanized tread strip stock which is employed in precured tread methods of retreading, and consequently in the present invention, should be distinguished from the unvulcanized tread strip stock employed in a hot retreading operation. The latter material is soft and can be permanently deformed by relatively low pressure or tension forces during handling and during application to a tire casing. As a consequence it is conventional to take special steps to avoid deforming or stretching the stock in order to avoid changes in the thickness and lateral dimensions of the stock. Precured tread stock, however, is tough and strong and will return to its original shape after deformation. Further, deformation occurs only under relatively more severe pressure or tension forces.

The invention will be further understood from the following detailed description of several embodiments, taken with the drawing in which:

FIG. 8 is a schematic elevational view of a second embodiment of a tire building machine.

Figure 1:
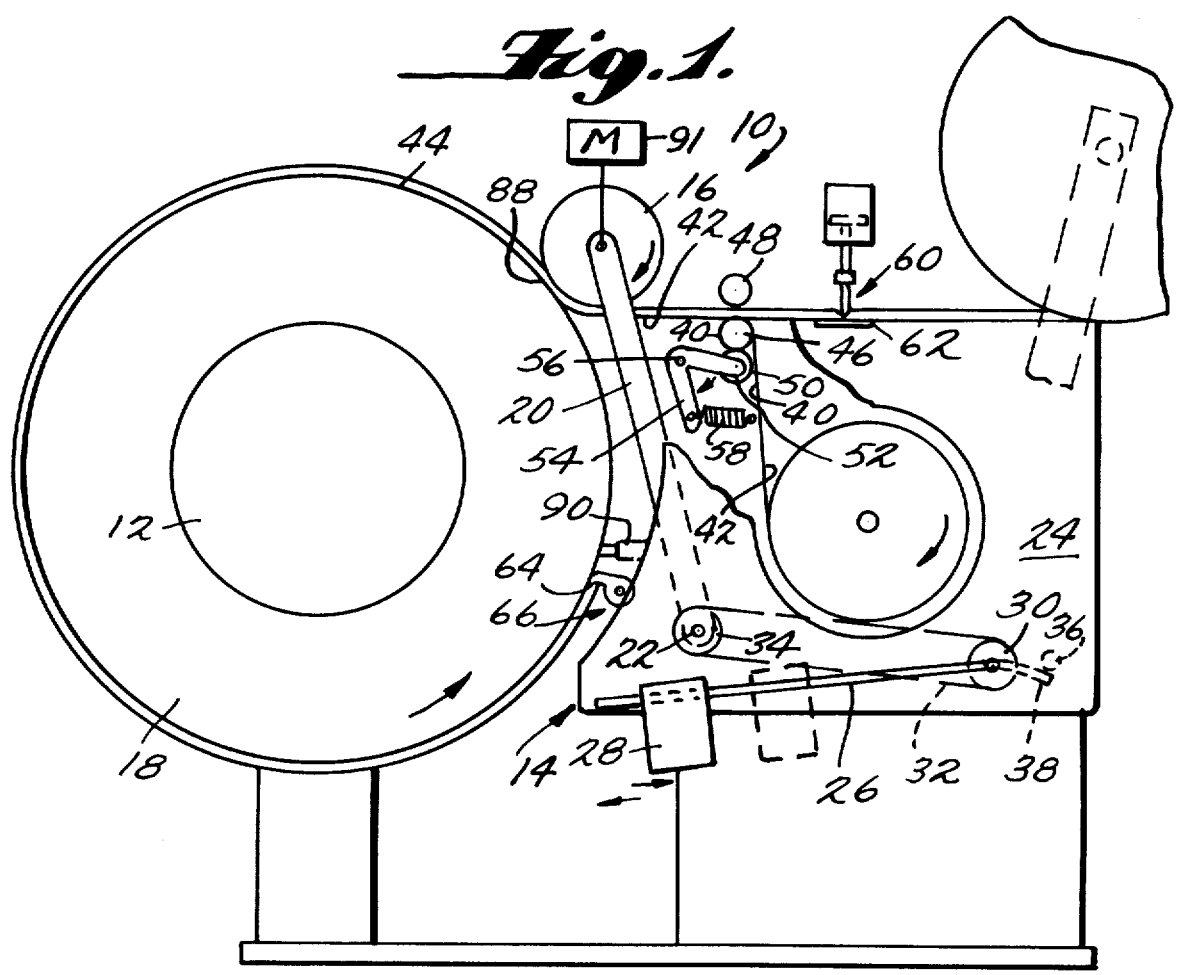
FIG. 1 is a schematic elevational view of a tire building machine, with some parts removed for simplicity, embodying the principles of the present invention.

Referring to FIG. 1, there is shown a tire building machine 10 which includes a floor-mounted base 12 on which is mounted a rotatable tire-receiving rim structure 12 and an applicator assembly 14 which is mounted, as by means of rails, on the base 12 for horizontal movement toward and away from the rim structure 12. A drive system (FIG. 2) is provided for adjusting the horizontal position of the application assembly 14.

The applicator assembly 14 includes a motor-driven applicator roll 16 which can be biased toward the rim structure so as to be capable of pressing against the periphery of a tire 18 mounted on the rim structure. In the illustrated embodiment, the roll 16 is carried between the upper ends of two upstanding arms 20 which are secured at their lower ends to a horizontal shaft 22 which in turn is journalled at its ends in rigid side plates, one of which is shown at 24. The illustrated biasing device includes a lever arm 26 which carries a slidable weight 28, the arm 26 being fixed at one end to a sprocket 30 which is rotatably mounted on the side plate 24. Torque on the sprocket 30 is transferred to the shaft 22 by means of a chain 32 looped over the sprocket 30 and a second sprocket 34 fixed to the shaft 22. Counter-clockwise movement of the arms 20 under the force of gravity is limited by a fixed stop 36 which is engaged by an arm 38 carried by the sprocket 34.

The position of the weight 28 along the arm 26 can be adjusted in order to vary the stretch imparted to the tread strip during application of the latter to the tire casing. This feature is important because it allows the operator to compensate for open tread designs, especially lug designs and traction designs that have no solid ribs to resist stretch, as well as to provide from 1 inch or more stretch down to substantially zero stretch.

Also carried by the applicator assembly 14 is a roller assembly for stripping the plastic cover sheet 40 from a strip of rubber bonding medium 42 and simultaneously lightly pressing the bonding medium 42 into engagement with the lower surface of the tread strip 44. The illustrated assembly includes a motor-driven roller 46 which with an upper, downwardly-biased roller 48 forms a nip which lightly presses the tread strip and bonding medium together. The plastic cover sheet 40, which is on the lower surface of the bonding medium as viewed in FIG. 1 is stripped from the bonding medium as it follows the periphery of the driven roller 46 into a nip formed by the engagement of the latter with a freely-rotatable take-up roller 50. The cover sheet is continuously wrapped around the take-up roller 50 during operation, and as the diameter of the resulting roll 52 of cover sheet increases, the take-up roller 50 moves away from the driven roller 46. The latter function may be accomplished by mounting the take-up roller 50 on an arm 54 pivoted at 56 and biased by a tension spring 58 toward the driven roller 46.

A tread-cutting device is also carried at a fixed location on the applicator assembly 14 for cutting the proper length of tread strip 44 before the bonding medium 42 is attached. In the illustrated embodiment the cutting device includes a vertically movable pneumatically-operated knife 60 disposed above the tread strip and a fixed horizontal plate 62 disposed below the tread strip.

The most important feature of the present invention is provision of a means for assuring that the length of tread strip which is cut from the supply thereof is correct for the particular size of tire being processed. Since tires of a rather wide range of circumferences will be retreaded, it is not possible to employ both a fixed cutting station and a fixed sensing point for the leading edge of the tread strip because such an arrangement would produce only a single length of tread strip. Accordingly, it is necessary to adjust one or more variables in the sensing and cutting operation to compensate for different tire circumferences.

Figure 2:
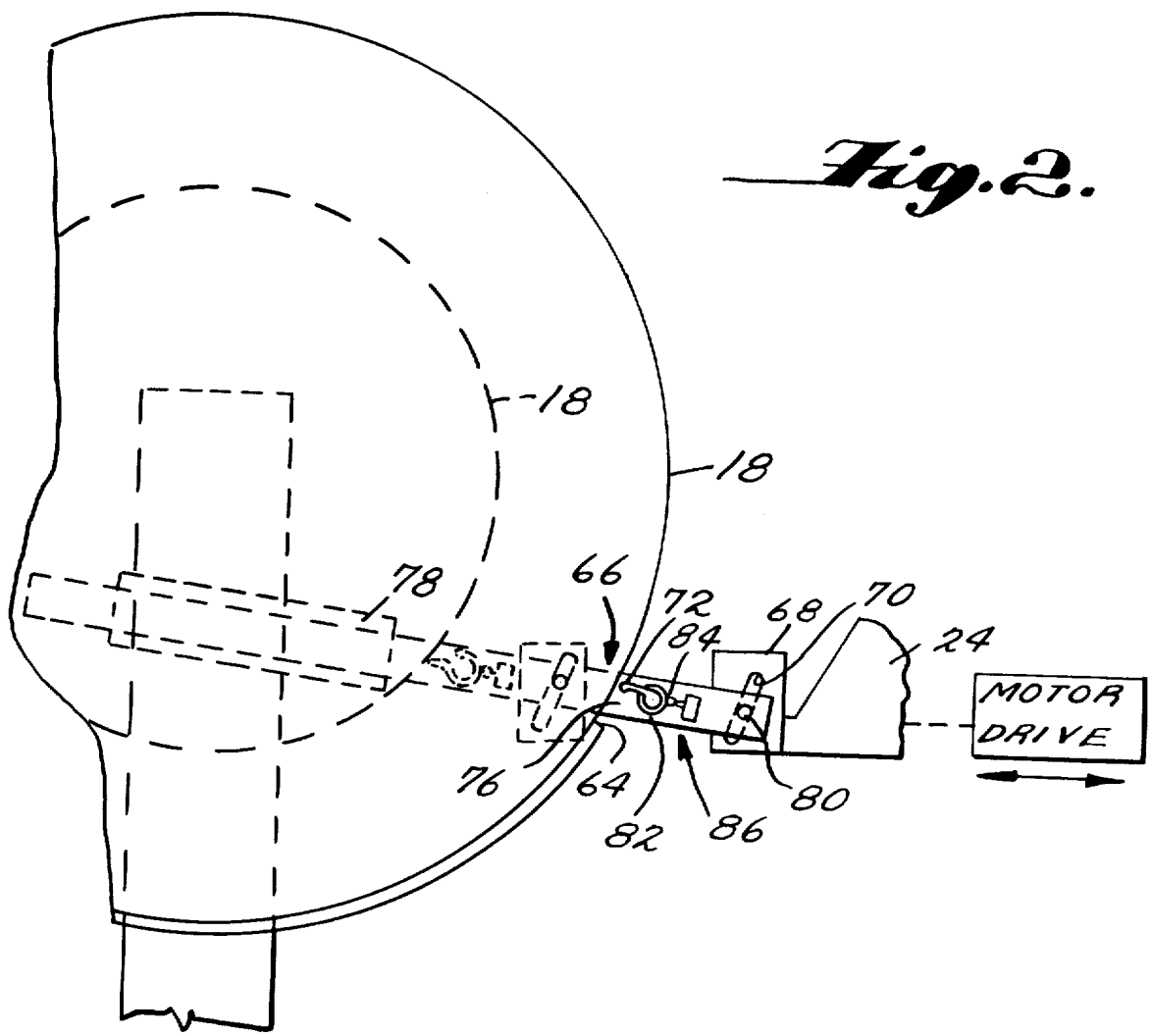
FIG. 2 is a schematic fragmentary view of part of FIG. 1.
Figure 3:
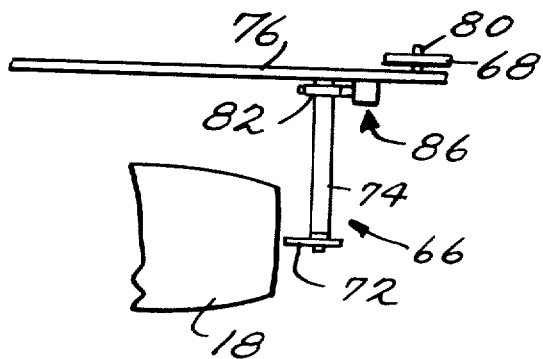
FIG. 3 is a plan view of the parts shown in FIG. 2.

The present invention in one of its preferred forms provides for the automatic adjustment of the length of strip to be cut by adjusting the location at which the leading edge 64 is sensed in accordance with tire circumference. This is accomplished in the illustrated embodiment and as shown in FIGS. 2 and 3, by mounting a sensor 66 for movement with the applicator assembly 14, and also along a special predetermined path. The special path is effected by means of a vertical cam plate 68 fixed to the side plate of the applicator assembly 14 and a linearly movable sensor support assembly which cooperates with an elongated inclined cam slot 70 in the plate 68. The sensor 66 includes a trigger 72 fixed to a horizontal shaft 74 which is rotatable about its own axis and carried on a support bar 76. The left end of the support bar 76 as viewed in FIG. 2 is slidably telescoped within a complementary inclined tube 78 which is fixed to the base 12 in any suitable manner. The right end of the support bar 76 carries a pin 80 which projects through the cam slot 70 with the result that horizontal movement of the applicator assembly 14 imparts movement of the trigger 72 along an inclined path toward the rim structure 12.

The remainder of the sensing arrangement includes a notched circular cam 82 fixed on the trigger shaft 74, the notch 84 receiving the movable element of a limit switch 86. When the leading edge 64 of the tread strip strikes the trigger 72, the latter together with the cam 82 are rotated and actuate the limit switch 86 which in turn stops the motor drive to the applicator roll.

It will be understood that movement of the trigger to the left along the inclined path has the effect of advancing counter-clockwise the position at which the leading edge of the tread strip will engage the trigger. It also has the effect of moving the trigger closer to the axis of the rim assembly. The clockwise inclination of the cam slot assures that the trigger will not engage the tire when the necessary advancing distance has been effected. It follows from the above that the smaller the diameter of the tire being retreaded the further to the left and the closer to the point of contact of tread strip and tire lies the trigger.

The precise inclination of the path along which the trigger is adjusted effects actuation of the trigger at a sensing point such that the fixed distance between the knife and the point of tread contact 88 with the tire is the same as the distance between the sensing point (point of contact between trigger and leading edge 64) and the point of tread contact measured along the circumference of the particular diameter tire being retreaded. In the illustrated embodiment the inclination of the trigger path is about 6½° from the horizontal.

In operation, after an inflated tire has been mounted on the rim structure, the operator acutates the motor drive of FIG. 2 to move the applicator assembly to the left along the fixed base 12 until the applicator roll 16 engages the tread strip which has been placed between the latter and the tire. This rocks the applicator roll assembly clockwise against the load applied by the weight 28 and lever arm motor drive for the latter. Usually about 30 to 60 pounds is applied to the tread strip. The purpose of the pressure is to stretch the tread strip as it is applied to the tire by the extruding action of the applicator roll 16. Usually about one inch of stretch is produced per tire circumference. In some cases it may be satisfactory not to stretch, but retread performance in terms of road life is improved if stretch is effected.

Movement of the assembly 14 horizontally along the base 12 is stopped when the trigger 72 arrives at a predetermined position which is slightly spaced from the periphery of the tire 18. This may be accomplished with the aid of a limit switch 90 attached to the assembly 66 in a position to engage the periphery of the tire 18 and cooperating with the drive system of FIG. 2 to shut off the latter upon such engagement. At this time the trigger 72 will also have been adjusted along its predetermined inclined path, as described above. Thus it will be seen that as the assembly 14 moves toward the tire being processed, the direction of movement of the trigger 72 can be regarded as including a component which is tangent to the periphery of the tire in a direction opposite to the direction of tire rotation. For a small diameter tire the assembly 14 will travel further to the left as viewed in FIGS. 1 and 2, before being stopped by the limit switch 90. As a result the sensing position of the trigger will be closer to the knife 60, measured along the path of the tread strip.

The operator then actuates the motor drive 91 for the applicator roll 16. When the leading edge 64 of the tread strip rotates the trigger 72, the motor drive 91 is stopped by actuation of the limit switch 86. At this point in time the length of tread strip extending forwardly of the knife 60 is proportioned to the diameter of the tire. The operator then manually operates the knife 60, applies cement to the end of the cut-off tread strip and jogs the motor drive by suitable controls to continue the wrapping operation. The splicing of the two ends of the strip is carried out conventionally.

It will be appreciated that the applicator roll 16 can be freely rotatable and the motor drive employed to drive the rim structure rather than vice versa as in the illustrated embodiment.

With respect to the mounting of the tire 18 preparatory to being retreaded, it is generally preferred that the tire 18 be inflated to a pressure sufficient to render it substantially non-deformable by the pressure of the applicator roll 16. It is also generally preferred to carry out the retreading with the tire bead width at its normal dimension. Both of these features may be accomplished with a rim structure 12 constructed in the form of two adjustably spaced-apart coaxial bead plates. The plates are adjusted to the normal bead width and the uninflated tire is then mounted on the plates and then inflated until the beads spread to the extent permitted by the rims of the plates. In some cases, however, it may not be necessary either to inflate or to adjust the bead width.

Figure 4:
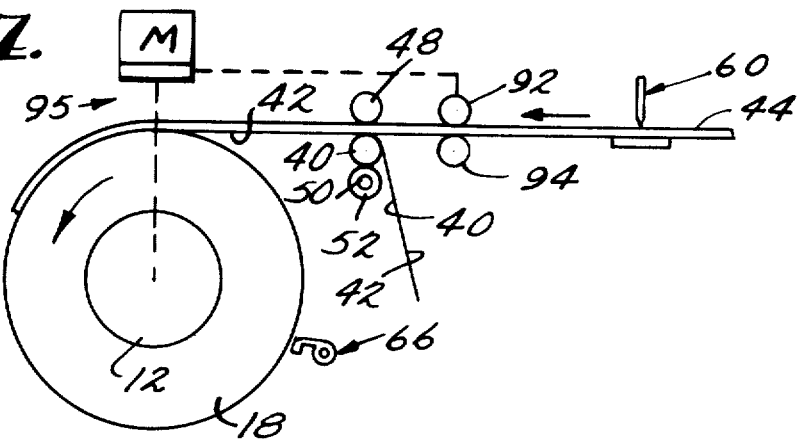
FIG. 4 is a fragmentary elevational view of a modified form of tire building machine.

An alternative manner for stretching the tread strip 44 as it is applied to the tire 18 is illustratd schematically in FIG. 4. In this embodiment the tread is stretched by driving the tire 18 after first attaching the leading edge of the tread 44 to the tire 18, as with cement, and then restraining the movement of the tread toward the tire 18. The restraining means may include a pair of nip rolls 92, 94 which are driven at a slightly lower peripheral speed than the tire 18 by a suitable motor drive 95. Alternatively, the rolls 92, 94 may be braked. The tire 18 may be driven by driving the rim 12 or by surface contact with a driven roller. The cement, which is a solution of rubber in a solvent, will generally have sufficient strength to prevent the tread from separating from the tire, and an applicator roll is usually not necessary. It is, however, necessary to stitch the tread to the tire and this may be accomplished after the cutting of the tread by the knife 18 and the cutting of the bonding medium by suitable means.

As in FIG. 1 embodiment, stitching may be accomplished by revolving the tire one or more revolutions while bringing a separate stitching roller into engagement with the tread with sufficient pressure to expel air from between the tread and the tire. As an alternative to stretching the tread while applying it to the tire, the tire may first be reduced in diameter and then released after the tread has been applied. This reduction in diameter may be accomplished in the case of non-radial tires by increasing the bead width of the tire, as by means of a conventional internal spreading device. Preferably, however, a special technique is employed using the rim structure 98 illustrated schematically in FIG. 5. First, the diameter of the tire 16 to be retreaded is measured after the buffing operation which is a conventional step in the retreading art. The diameter can be marked on the exterior of the side wall for future reference. The tire is then mounted on the rim structure 98 which includes two coaxial spaced apart bead plates 100, 102. The plate 100 is carried on one end of a piston rod 104 which extends through the other plate 102. The other end of the rod 104 carries a piston 106 which is slidable within a cylinder 108 containing hydraulic fluid.

When the tire is mounted on the plates 100, 102 and inflated through a valve 109, the tire beads exert a spreading force on the plates and become sealed thereto. Actual movement of the plate 100 is prevented, however, until hydraulic fluid is vented from the left side of the piston 106 to the right side, by opening a valve 110 in a by-pass line 112. allowing the bead width to increase permits the tire diameter to decrease, and by closing the valve 110 at the appropriate time the diameter of the tire can be reduced to less than the previously measured diameter. Approximately three-eighth inch reduction in diameter is usually sufficient. In order to determine when the valve 110 should be closed, the changing diameter of the tire may be measured in any convenient manner, as with a mechanical indicating device 114.

Figure 5:
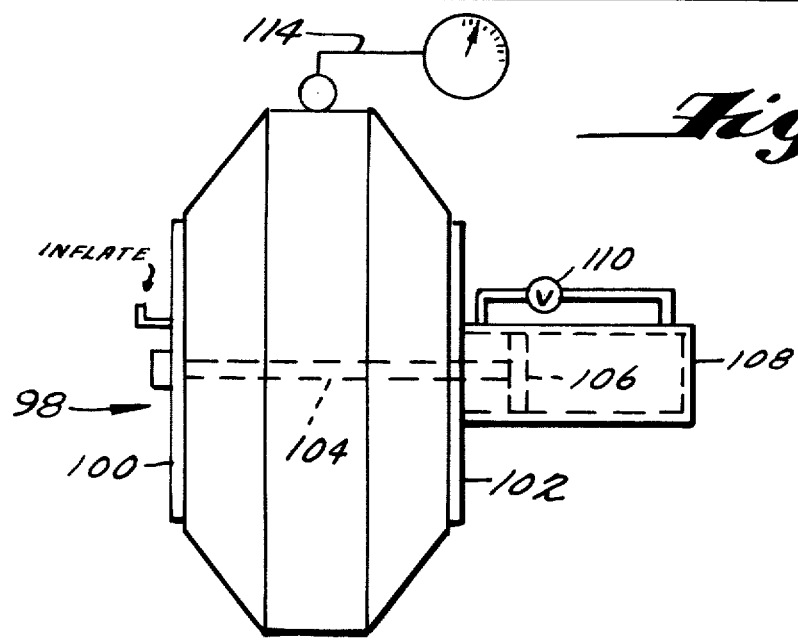
FIG. 5 is a schematic illustration of a special rim structure for use in carrying out certain features of the present invention.

The special rim structure 98 of FIG. 5 may be employed as the rim structure in the arrangement indicated in Fig. 1, and in that event it will not be necessary to impart stretch to the tread by loading the applicator roll 16. When the beads are released after application of the tread, the tire returns to near its original diameter, and the tread is thereby stretched.

Figure 6:
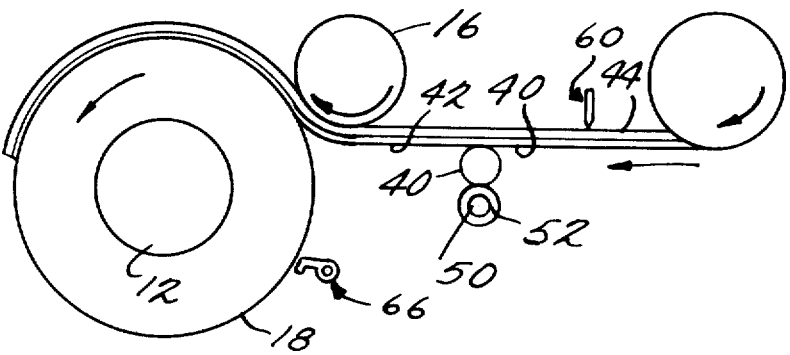
FIGS. 6 and 7 illustrate schematically two modified procedures by which the bonding medium may be applied.

FIG. 6 illustrates schematically the application of a tread strip 44 to the periphery of a tire 18 where the bonding medium 42 has previously been attached to the undersurface of the tread strip during a separate operation. The separate operation may have been a factory operation in which the continuous roll of tread strip and bonding medium is made up as part of the manufacturing operation. Alternatively, the tread strip and bonding medium may have been joined together by the tire retreading shop as part of its operation. The process illustrated in FIG. 6 may include any of the alternative procedures described above with respect to stretching and dimensional control of the tire diameter.

Figure 7:
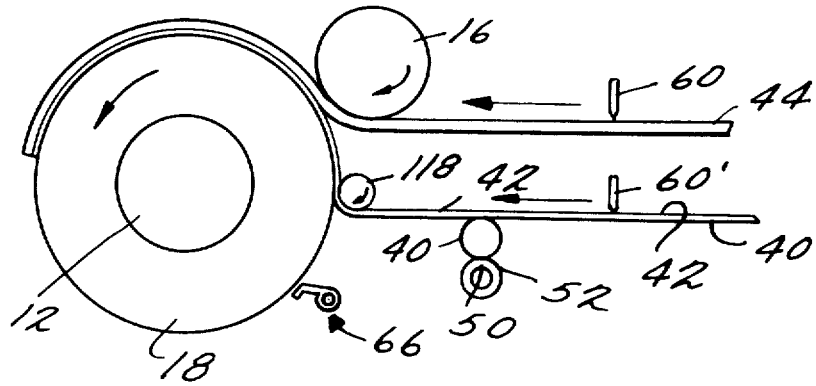

FIG. 7 illustrates schematically the application of the bonding medium 42 to the tire periphery prior to the application of the tread 44. A separate applicator roll 118 may be used for this purpose, and the bonding medium may be applied while the tread is being applied, as shown, on as a separate step. In the latter case, the medium is applied to the entire tire circumference before application of the tread is begun.

FIG. 8 illustrates a builder 10' which is analogous to that illustrated in FIG. 2, but which differs in that the position of the tread cutting station, rather than the sensor for the moving tread, is adjusted in accordance with tire size. As shown, the trigger 72' is fixed to the applicator assembly 14' and moves horizontally therewith, while the horizontal position of the cutting assembly 60' is adjusted automatically by a drive 101 when the assembly 14' is moved horizontally along the fixed base 12'. Broadly, the drive 100 may be any suitable means for moving the cutting assembly 60' away from the tire 18' in accordance with movement of the assembly 14' toward the tire 18'. A preferred type of drive is a hydraulic-pneumatic drive whih is interconnected with a hydraulic-pneumatic drive for the assembly 14' so as to operate proportionally to the latter.

Referring more specifically to FIG. 8, it will be seen that the assembly 14' is horizontally movable with respect to its base 12' by a piston rod 102. The piston rod 102 is moved to the left by air pressure introduced into its cylinder 104 through a tap 106 so as to act on the right side of a piston 108. As in the FIG. 1 embodiment, movement of the assembly 14' is stopped by a limit switch (not shown in FIG. 8) or its equivalent when the trigger 72' arrives at a position in which it will be contacted by the progressing tread strip 44'. The assembly 14' is shown in solid line relative to a large diameter tire and is phantom line relative to a small diameter tire.

During movement of the piston 108 to the left oil is forced through a line 110 to a flow divider 112 of conventional construction which splits the oil flow between lines 114 and 116. The major portion of the oil flows to a reservoir 118 and a minor, predetermined portion flows into a cylinder 120 to act against the right side of a piston 122. The proportion of diverted oil and the sizes of the cylinders 108 and 120 are such that movement of the piston 122 in the cylinder 120 is only a fraction of the movement of the piston 108. Approximately 5 psi air pressure is maintained above the oil in the reservoir. In order to return the assembly 14' to its normal position to the right of that shown in FIG. 8, the air pressure is exhausted from the cylinder 104 and air pressure is applied to the reservoir 118. Simultaneously, air pressure is applied to the left end of the cylinder 120 through a tap 124 so as to drive the piston 122 to the right. A higher air pressure is used in the cylinder 120 than in the reservoir 118 to assure that the piston 122 returns full stroke.

The proportional movement of the piston 122 adjusts the position of the cutting assembly 60' along the path of travel of the tread strip 44'. The assembly 60' includes a vertically movable knife blade and drive system 126 secured to a base plate 128 by a bracket 130. The base plate 128 is slidably mounted on a pair of fixed shafts one of which is shown at 132. Movement back and forth along the shaft 132 is effected by a double rack and pinion arrangement which includes an upper rack 134 secured to the base plate 128, a pinion gear 136 journalled on the assembly 14' and a lower rack 138. The lower rack 138 is slidable in a channel-shaped guide 140 and is attached to the left end of a piston rod 142 which carries the piston 122. Movement of the piston 122 to the left as the assembly 14' moves to the left causes the entire cutting assembly 60' to move to the right, away from the tire 18'. This relationship is necessary because, for a smaller diameter tire, less angular rotation of the tire 18' will cause engagement of the leading edge of the tread strip 44' with the trigger 72'. In practice only a relatively small adjustment of the cutting assembly 60' is required, for example, 1 to 2 inches.

It will be understood that the extent of movement of the cutting assembly 60' in the FIG. 8 embodiment and of the trigger 72 in the FIG. 1 embodiment will depend in part on the arrangement of various components of the machine, including the position of the limit switch 90. Once the correct relationship has been established, the machine will automatically adjust the assembly 60' or the trigger 72 to the proper position as the assembly 14' or 14 moves to its operational position as determined by the limit switch 90 or its equivalent.

What is claimed is:

1. Apparatus for applying a strip of tread to the periphery of a tire casing mounted for rotation about its axis comprising: means for withdrawing tread from a source thereof and for feeding it on to the periphery of the tire casing as the latter rotates about its axis so that a free edge of the strip progresses around said axis; a sensor for sensing the arrival of the leading edge of a tread strip at a given position during rotation of the tire casing; a tread cutting assembly for severing the strip from the source at a position intermediate the source and the tire casing, said cutting assembly being mounted for adjustment toward and away from said sensor along the path of travel of the tread strip; and control means responsive to the diameter of the tire casing for adjusting the position of said cutting assembly, and hence the distance between said sensor and said cutting assembly along the path of travel of the tread strip such that activation of the sensor occurs at a point in time when said distance equals the circumference of the tire casing, whereby the cutting assembly will sever a strip of tread having a length appropriate to the tire casing being processed.

2. Apparatus as in claim 1 wherein said control means includes a sensor movable into engagement with the periphery of the tire.

3. Apparatus as in claim 1 wherein said sensor for sensing the leading edge of the tread strip is mounted for adjustment toward and away from said cutting assembly along the path of travel of the tread strip.

4. Apparatus for applying tread strip to the periphery of a tire comprising: a rotatable tire receiving rim structure including two spaced apart bead plates between which a tire may be mounted with its beads engaageable with said bead plates, at least one of said bead plates being freely movable along a path toward and away from the other, means for inflating a tire which has been mounted between said plates so as to force the beads into sealing engagement with said plates, and means for locking the movable plate in any of a variety of positions along said path whereby the diameter of an inflated tire may be controlled; an applicator roll adapted to receive a tread strip between its periphery and the periphery of a tire mounted on said rim structure; means rotatably mounting a roll of tread strip near said applicator roll; means for effecting rotation of said rim structure whereby tread is unwound from the roll thereof and wrapped around the periphery of the tire; means rotatably mounting a roll of bonding medium laminated with a plastic cover sheet; roller means operable with rotation of said rim structure for withdrawing bonding medium from the roll thereof, for stripping off the plastic cover sheet and for guiding the bonding medium into a position between the tread being withdrawn from its roll and the periphery of a tire mounted on said rim structure; means for cutting the tread strip after withdrawal from its roll.

5. Apparatus for applying a strip of tread to the periphery of a tire casing mounted for rotation about its axis comprising: means for withdrawing tread from a source thereof and for feeding it on to the periphery of the tire casing as the latter rotates about its axis so that a free edge of the strip progresses around said axis; a sensor for sensing the arrival of the leading edge of a tread strip at a given position during rotation of the tire casing; a tread cutting assembly for severing the strip from the source at a position intermediate the source and the tire casing; and control means responsive to the diameter of the tire casing for adjusting the distance between said sensor and said cutting assembly along the path of travel of the tread strip such that activation of the sensor occurs at a point in time when said distance equals the circumference of the tire casing, whereby the cutting assembly will sever a strip of tread having a length appropriate to the tire casing being processed.

6. Apparatus as in claim 5 wherein said control means includes means for adjusting the position of said sensor relative to said cutting assembly along the path of travel of the tread strip.

7. Apparatus as in claim 6 wherein said control means includes a sensor movable into engagement with the periphery of the tire.

8. Apparatus as in claim 6 wherein said control means includes a fluid pressure drive for moving said cutting assembly.

* * * * *